United States Patent [19]

Shirai et al.

[11] Patent Number: 4,662,674
[45] Date of Patent: May 5, 1987

[54] ARM REST HOUSING

[75] Inventors: Tamotsu Shirai; Toshiya Kuroyanagi, both of Akishimashi, Japan

[73] Assignee: Tachikawa Spring Co., Ltd., Tokyo, Japan

[21] Appl. No.: 640,790

[22] Filed: Aug. 14, 1984

[30] Foreign Application Priority Data

Aug. 19, 1983 [JP] Japan ............... 58-129108[U]

[51] Int. Cl.⁴ .............................................. A47C 7/54
[52] U.S. Cl. ..................................... 297/113; 297/417
[58] Field of Search ............... 297/113, 115, 117, 191, 297/238, 411, 417

[56] References Cited

U.S. PATENT DOCUMENTS 3,909,063 9/1975 Bowsch et al. ................ 297/113
3,951,448 4/1976 Hawie ............................ 297/113

FOREIGN PATENT DOCUMENTS 525298 5/1956 Canada ............................ 297/113

Primary Examiner—Francis K. Zugel
Assistant Examiner—Peter R. Brown
Attorney, Agent, or Firm—Hoffmann, Dilworth, Barrese & Baron

[57] ABSTRACT

A construction of the interior of an arm rest housing is provided. The cloth which forms the upper wall of a recessed arm rest housing is stitched to cloths forming a left and right side walls thereof keeping the seams outside. The extension of the cloth is extended around the frame located inside the seat and terminates in one end. This end is fixed to a fixing wire and a panel is affixed on the fixing wire. In this construction an improved interior construction of the arm rest housing in a seat for vehicles is disclosed wherein there is defined spaced in a portion of frame corresponding to the seams of the cloths, whereby the seams extend through such space into the inside of the seat. In this manner, bulging at the corners of the interior of the housing is avoided and the exterior appearance is enhanced.

1 Claim, 4 Drawing Figures

1

ARM REST HOUSING

FIELD OF THE INVENTION

The present invention relates to an improvement of the interior construction of an arm rest housing in a seat for vehicles (automobile).

BACKGROUND OF THE INVENTION

The arm rest housing is a recessed part provided approximately in the center of a seat back. The housing is generally formed by stitching of the cloth (b) which forms the upper wall to the cloths (a) and (a') which form the left and right side walls keeping the seams (c) and (c') outside, extending the extension of the cloth (b) around a frame (10) located inside the seat, fixing the end of such extension to a fixing wire (11) and affixing a panel (d) on the frame (10).

In the case of a conventional arm rest housing of this type, the cloth at the corners of the interior bulges which impairs the sense of beauty of the external appearance, and due to this bulging, the arm rest cannot be properly housed therein.

SUMMARY OF THE INVENTION

The present invention is an improvement based on the above-mentioned facts and an object thereof is to provide an improved construction of the interior of an arm rest housing with an improved external appearance and a drastically improved housing of an arm rest.

A construction of the interior of an arm rest housing is provided wherein the cloth (b) which forms the upper wall a recessed arm rest housing, is stitched to the cloths (a) and (a') which form the left and right side walls thereof, keeping the seams outside. The extension of the cloth (b) is extended around on the frame located inside the seat and terminates in one end. This end is fixed to a fixing wire and panel is affixed on the fixing wire (11). An object of the present invention can be achieved by an interior construction of an arm rest housing in a seat for vehicles which comprises space for allowing the seams to extend thereinto, the space being provided in a position of the frame corresponding to the seams of the cloths (a), (a'), and (b).

BRIEF DESCRIPTION OF THE DRAWINGS

In the Figures;

FIG. 2 shows a perspective view of the seat thereof.

FIG. 3 shows a vertical cross sectional view of the interior construction of the arm rest housing, and FIG. 4 shows a perspective view thereof, being partially cut.

DESCRIPTION OF THE PREFERRED EMBODIMENTS

Figure 1:
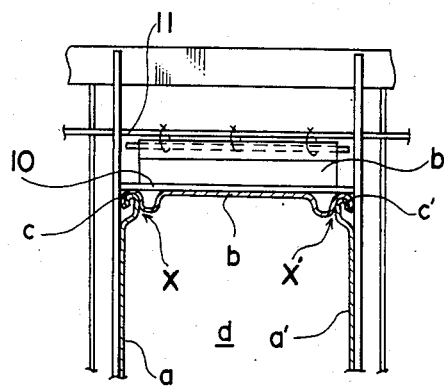
FIG. 1 is a vertical cross sectional view of the interior construction of a conventional arm rest housing.

First, in order to understand the present invention, the interior construction of a conventional arm rest housing is described with reference to FIG. 1.

As described above, generally the interior construction is formed by stitching the cloth (b) which forms the upper side wall to cloths (a) (a') which form the left and right side walls, keeping the seams (c) and (c') outside, extending the extension of cloth (b) of at least one side around the frame (10) located inside the seat, fixing the end of such extension to the fixing wire (11) and affixing the panel (d) on the frame (10).

In a conventional interior construction, the upper corner (X) of the bottom bulges due to touching of said seam (c) of said cloths (a) and (b) with the frame (10). For this reason it is impossible to achieve a clear shape along the frame (10). Therefore, the external appearance is bad because the interior of the housing can be seen from outside when using the arm rest. Moreover, even when the arm rest is housed in the housing, the arm rest is not satisfactorily housed because of the bulges at the bottom of the housing.

Figure 3:
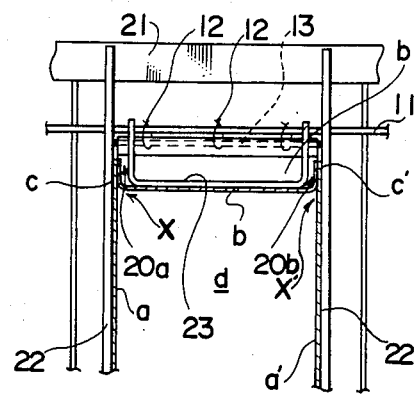
FIGS. 2 to 4 are one embodiment according to the present invention.
Figure 2:
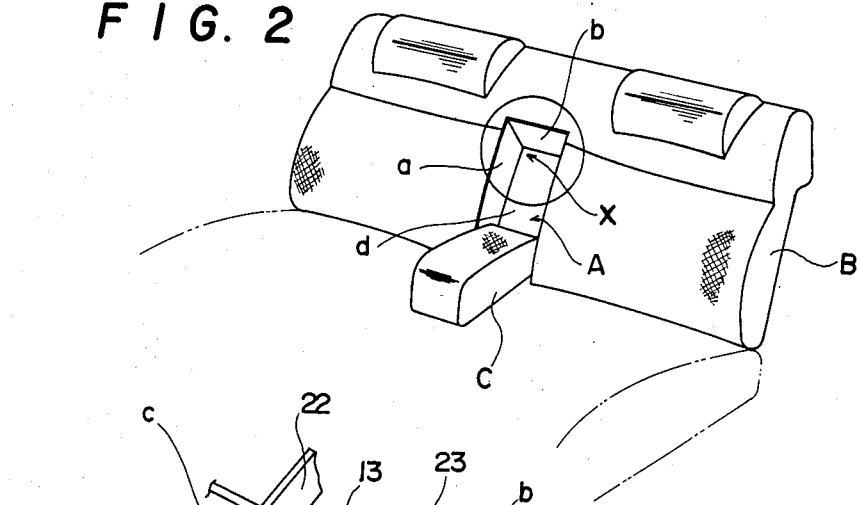
Figure 4:
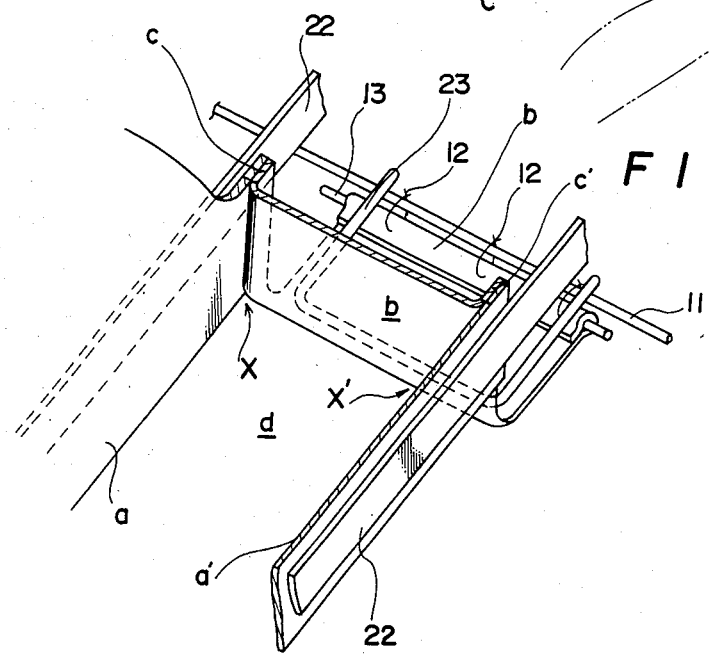

Following is one embodiment according to the present invention with reference to FIGS. 2 to 4.

The arm rest housing (A) is provided approximately in the center of a seat back (B) for housing the arm rest (C) as shown in FIG. 2. The corners (X) (X') of its interior are of a rectangular shape as shown in FIG. 3 and FIG. 4.

The arm rest housing (A) consists of cloths (a) and (a') which form the left and right side walls thereof, cloth (b) which forms the upper side wall, the panel (d), and the cloth which forms the lower side wall. This cloth cannot be seen from outside because of the arm rest (C) and said cloth is not necessary in the case of an arm rest housing whose lower side is open. These constituent members form the shape of the interior along the contour of the frame provided inside the seat back (B).

The frame consists of vertical frames (22) (22) fixed between the upper and lower seat frames (21) and horizontal frame (23) made of wire which is fixed horizontally such that it is disposed between the vertical frames (22) (22). The horizontal frame (23) is U-shaped so that the vertical frames (22) (22) are spaced from the left and right portions of the horizontal frame (23), and the left and right portions of the horizontal frame (23) are respectively at its end fixed to the wire (11). The horizontal frame (23) is rearward of the vertical frames (22) (22) and is spaced inward so that substantially parallel vertical planes of the left and right portions of the horizontal frame (23) and the vertical frames (22) (22) are spaced apart to provide a space for insertion of the seams (c) and (c').

The above-mentioned cloths (a) (a') and cloth (b) are affixed so that the seams (c) (c') thereof lie outside. The extension of said cloth (b) is pulled from inside of the horizontal frame (23) toward the fixing wire (11), and its end is fixed to the fixing wire (11) by hog rings (12). The edge of the lower end of cloths (a) (a') are folded outside of the vertical frames (22) (22) and are fixed by mounting of the panel (d) to be affixed to the frame. An insert wire (13) in the Figure is fixed to the outside of the frame by the hog rings (12) after affixing the cloths (a) (a') and (b) to the frame.

In this manner, since the edges of the seams (c) (c') of the cloths (a) (a') and (b) which are stitched into a tubular shape and the upper ends of which are stitched to a top member material of the seat back (B) are inserted into the corresponding spaces (20a) (20b) which are each formed at the respective left and right portions of the horizontal frames, the corners (X) (X') in the interior of the arm rest housing (A) can be affixed keeping the angular shape.

The spaces (20a) (20b) as shown in the Figure are defined by bending the horizontal frame (23) which makes up the frame into a U-shape and further fixing its both ends to the fixing wire (11). However, with regard to an arm rest housing in which the frame (23) is directly fixed to the frames (22) (22), forming the spaces (20a) (20b) by folding both ends of the horizontal frame (23) toward outside into a U-shape is also an option.

According to the construction as described in the present invention, since the seams of the cloths extend into the spaces defined in the frame, the cloth can be affixed along the contour of the frame and, thus, there is no bulging of the corners of the interior as in the case of a conventional arm rest housing as described above. Therefore, as compared with a conventional one, the appearance can be improved and also the housing can be formed into a desired shape. Thus, the state of housing of an arm rest becomes extremely satisfactory.

We claim:

1. An arm rest housing in a back rest comprising:
   a top panel having at least one portion extending into the inside of said back rest;
   a pair of side panels joined to said top panel, with a pair of corresponding seams extending outwardly,
   a pair of frame members each supporting the respective said pair of side panels;
   a fixing wire extending within said back rest;
   a U-shaped frame fixed to said fixing wire, around which U-shaped frame, said at least one portion of said top panel extends and is anchored to said fixing wire; and
   the U-shaped frame having a left lateral frame section and a right lateral frame section whereby said seams of said pair of side panels and said top panel are each extended along the extending direction of the respective left and right lateral frame sections into the inside of said back rest.

* * * * *